United States Patent Office

3,539,531
Patented Nov. 10, 1970

3,539,531
BENZOPHENONE-PHOSPHONATE COMBINATION
AS POLYMER STABILIZERS
William O. Drake and Kenneth R. Mills, Bartlesville,
Okla., assignors to Phillips Petroleum Company, a corporation of Delaware
No Drawing. Filed Oct. 13, 1967, Ser. No. 675,056
Int. Cl. C08b 27/66; C08f 45/58
U.S. Cl. 260—45.95                                    12 Claims

ABSTRACT OF THE DISCLOSURE

Polymer compositions such as, for example, polyolefins, are stabilized by a mixture of certain benzophenones with certain organic phosphonates.

---

This invention relates to stabilizers for synthetic and natural polymers. In another aspect, this invention relates to stabilized synthetic and natural polymers. In still another aspect, this invention relates to the stabilization of polymers against deterioration resulting from exposure to heat and light, said stabilization being accomplished with a novel combination of stabilizers.

Polymers such as polyolefins, many times undergo degradation and discoloration in use. This may occur as a result of exposure to light, particularly, ultraviolet light, or as a result of processing, e.g., milling or other working at elevated temperatures, i.e., above about 200° F.

Much effort has been devoted to the problem of finding satisfactory stabilizers to protect polymers from the effects of heat and light. Particularly, much effort has been devoted to finding satisfactory stabilizers to protect polyolefins from the effects of heat and ultraviolet light.

Many kinds of additives have been proposed hitherto for use in polymers such as hydrocarbon polymers, but there is still a need in the art for an effective stabilizer system that will confer stability, particularly, both heat and light stability, under certain of the more severe conditions of processing and subsequent consumery usage to which such polymers may be subjected.

In accordance therewith, one object of this invention is to provide a novel stabilizer system for synthetic and natural polymers.

Another object of this invention is to provide novel stabilized polymer blends.

A further object of this invention is to provide a blend of ingredients suitable for inhibiting the thermal and light deterioration of synthetic and natural polymers.

Still, a further object of this invention is to provide a blend of ingredients suitable for inhibiting the ultraviolet light deterioration of olefin polymers.

According to the invention, synthetic and natural polymers are stabilized against thermal and light deterioration by a mixture of (a) certain organic phosphonates, and (b) certain benzophenones. The mixture reacts to inhibit thermal and light, particularly, ultraviolet light, deterioration of the synthetic and natural polymers.

The organic phosphonate components of the stabilization mixture of this invention are represented by the general formula:

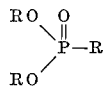

wherein R is an alkyl, cycloalkyl, or aryl group or combinations thereof, such as, for example, alkaryl, aralkyl, and the like, having from 1 to 20 carbon atoms. Examples of some suitable organic phosphonates that can be used are diethyl ethylphosphonate, dibutyl butylphosphonate, bis(2-ethylhexyl), 2-ethylhexylphosphonate, dicyclohexyl phenylphosphonate, dibenzyl butylphosphonate, bis(3-methylphenyl) eicosylphosphonate, bis(3,5-dicyclopentylphenyl) isononylphosphonate, bis(3-phenylcyclohexyl)-3-phenylcyclohexylphosphonate, bis(2-naphthyl) 2-naphthylphosphonate, bis(4-tetradecylphenyl) 4-tetradecylphenylphosphonate, and mixtures thereof, and the like.

The benzophenones of the stabilized mixtures of this invention are represented by the general formula:

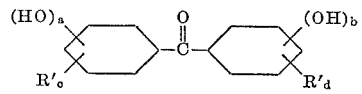

wherein R′ is R as defined above or OR, a, b, c, and d, are each 0 or 1, and the sum of a+b and of c+d, respectively, is 1 or 2, and further, if a+b equal 1, the resulting hydroxy group is either in the 2 or 6 position on the corresponding benzene ring. Examples of suitable benzophenones include: 2-hydroxy-4-n-octoxybenzophenone, 2,2′-dihydroxy-4-n-octoxybenzophenone, 2,2′-dihydroxy - 4 - methoxybenzophenone, 4-methoxy-2,2′-dihydroxybenzophenone, 2,3′-dihydroxy - 5,5′ - dieicosylbenzophenone, 3,3′-dihydroxy - 5,5′ - dicyclopentoxybenzophenone, 2,2′-dihydroxy-6,6′-dibenzyloxybenzophenone, 2-hydroxy-4′-(4-tetradecylphenyl)benzophenone, 2-hydroxy-4-(3-phenylcyclohexyl)benzophenone, and mixtures thereof, and the like.

The present invention is suitable for the stabilization of all olefin polymers and copolymers known in the art, particularly, for the stabilization of polymers of 1-olefins having from 2 to 10 carbon atoms, including both straight-chain and branched-chain, such as ethylene, propylene, butene-1, pentene-1, 4-methylpentene-1, 3-methylbutene, 3,3-dimethylbutene-1, and the like. Copolymers of two or more of these olefins can also be stabilized by the mixture of this invention, such as copolymers of ethylene with propylene or butene-1.

Other polymers that can be stabilized according to this invention include polycarbonates; cellulosics such as ethyl cellulose, cellulose acetate, cellulose propionate, cellulose acetate butyrate, cellulose nitrate and the like; polyvinyl chloride and related polymers, such as polyvinyl chloride-acetate, polyvinylidene chloride, polyvinyl fluoride, polyvinylidene fluoride, polyvinyl dichloride, and the like.

Polymeric materials capable of being stabilized according to this invention are described in Modern Plastics Encyclopedia, McGraw Hill, Incorporated, 1965, vol. 42, No. 1A. Mixtures of these materials can also be used.

The stabilization mixture of this invention comprises a mixture of at least one of the above-described phosphonates with at least one of the above-described benzophenones. The components can be admixed in any desired proportions; however, it is preferred that the ratio of the phosphonate component or components to the benzophenone component or components be in the range of from 0.0001:1 to 1:0.0001. More preferably, the ratio of the phosphonate to the benzophenone is in the range of from 0.01:1 to 1:0.01.

The phosphonate and the benzophenone are each blended into a polymer composition in any desired amount. Generally, the phosphonate and the benzophenone are each blended into the polymer in the concentration of 0.001 to 10, and preferably, 0.02 to 2 parts by weight per 100 parts by weight of polymer (PhP).

It is to be understood that conventional additives such as fillers, pigments, other stabilizers, plasticizers, and the like can be present in the novel stabilized blend of this invention.

Any suitable method can be employed for incorporating the additive combination of this invention into the polymers. Several such methods are well known. For example, the combined additives can be sprayed on the polymer powder from solution (e.g., in acetone) prior to pelletizing. In a particularly suitable method, stabilized blends are prepared by dry blending the additives with the polymer, for example, in a powder blender, and thereafter, mechanically working the resulting dry blend at an elevated temperature, as for example, by milling at a temperature above about 200°F. or by extrusion or by mixing in a Banbury mixer or the like, e.g., at 300–360° F. Mixing can be carried out in an extruder, for example, so that the resulting composition is formed as pellets for supplying to the plastic molding industry.

The polymer compositions of the present invention can be used generally for the fabrication of plastic material or articles, e.g., by blow molding, injection molding, or melt extrusion. The polymer compositions of the present invention appear to give rise to less odor during thermal processing operations than do corresponding polymer compositions that do not contain applicants' novel stabilization mixture. Also, of utmost importance, the polymer compositions of the present invention are more resistant against deterioration resulting from exposure to ultraviolet light than are corresponding polymer compositions which do not contain applicant's novel stabilization mixture.

The effect of ultraviolet light on a polymer, for example, an olefin polymer, is to cause degradation which makes the polymer brittle. Brittleness can be measured by a flexing test on a molded or extruded polymer sample, and the light stabilizing effectiveness of a particular additive can be expressed in terms of the brittleness of the polymer containing the additive as determined by the flexing test. For example, a polymer sample of standard dimensions containing the additive (conveniently a strip ¾ inch wide, 2¼ inches long and 20 mils thick) can be exposed to ultraviolet radiation for a sufficiently long period that breakage occurs on the first flexing. The number of hours that a particular sample is subjected to ultraviolet light before it breaks during a 180° flexure is a measure of the polymer's brittleness.

The following example is given for illustrative purposes only and it not to be construed to limit the scope of this invention.

EXAMPLE I

The polymer used in this example was a polypropylene, prepared with a diethylaluminum chloride-TiCl₃⅓ AlCl₃ catalyst and had a melt flow (ASTM D 1238–62T, Condition L) of about 5 dq./min. and a density (ASTM D 1505–63T) of 0.905 g./cc. It contained 0.1 p.h.p. of dilaurylthiodipropionate and 0.1 p.h.p. of 2,6-di-tert.-butyl-4-methylphenol (thermal stabilizers), and was in the form of a powder of "fluff." To prepare each sample as illustrated in Tables I through III below, the polypropylene was mixed with the amount of the additives as indicated in the tables by mixing in an acetone slurry, drying, and blending in a Brabender Plastograph for 8 minutes at 50 r.p.m. and 356° F. in a nitrogen atmosphere.

The resulting blended mixtures were then formed into sheets 20 mils thick and samples ¾ inch by 2¼ inches were cut therefrom for testing. The samples were tested by aging in an Atlas weatherometer under an ultraviolet light in circulating air at about 140° F. They were subjected to a water spray for 18 minutes out of each 2 hour period. Failure was indicated by breakage during a 180° flexure. The indicated hours to failure for each sample in Tables I–III below is an average of the failure time for three samples.

In Tables I–III below, the HOBP signifies 2-hydroxy-4-n-octoxybenzophenone, the EP signifies diethyl ethylphosphonate, the BP signifies dibutyl butylphosphonate, and the EHP signifies bis(2 - ethylhexyl) 2 - ethylhexylphosphonate.

TABLE I

| | Additive, p.h.p. | | Hours to failure |
|---|---|---|---|
| | HOBP | Phosphonate | |
| Sample No.: | | | |
| 1 | 0.0 | 0.0 | 166 |
| 2 | 0.1 | 0.0 | 255 |

This table illustrates that the benzophenone alone effects considerable improvement in ultraviolet stability.

TABLE II

| | Additive, p.h.p. | | Hours to failure |
|---|---|---|---|
| | HOBP | Phosphonate | |
| Sample No.: | | | |
| 3 | 0.0 | 0.1 (EP) | 166 |
| 4 | 0.0 | 0.1 (BP) | 166 |
| 5 | 0.0 | 0.1 (EHP) | 166 |

A comparison of the data for samples 3, 4, and 5 in this table with those of sample 1 in Table I illustrates that the phosphonates alone effect no improvement in ultraviolet stability.

TABLE III

| | Additive, p.h.p. | | Hours to failure |
|---|---|---|---|
| | HOBP | Phosphonate | |
| Sample No.: | | | |
| 6 | 0.1 | 0.1 (EP) | 321 |
| 7 | 0.1 | 0.1 (BP) | 326 |
| 8 | 0.1 | 0.1 (EHP) | 300 |

A comparison of the data for samples 6, 7, and 8 in Table III with those for samples 3, 4, and 5 in Table II illustrates that the combined benzophenone-phosphonate additives effect a substantial improvement in ultraviolet light stability. Also, a visual examination of samples 6, 7, and 8, after the milling operation indicated no evidence of thermal degradation. The odor, on milling, was good.

The preferred modes of practicing this invention having been described, other modifications within the scope of this invention will be apparent to persons skilled in the art.

We claim:

1. A mixture comprising:
 (a) at least one organic phosphonate having the formula:

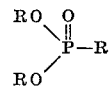

wherein R is an alkyl, a cycloalkyl, or aryl group, or combinations thereof, having from 1 to 20 carbon atoms; and
 (b) at least one benzophenone compound having the general formula:

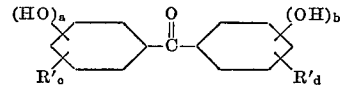

wherein R' is R as defined above or OR and wherein a, b, c, and d are each 0 or 1, and the sum of a+b and of c+d, respectively, is 1 or 2, and further if a+b equal 1, the resulting hydroxy group is either in the 2 or 6 position on the corresponding benzene ring.

2. The mixture of claim 1 wherein the ratio of the phosphonate to the benzophenone is in the range of from 0.0001:1 to 1:0.0001.

3. The mixture of claim 1 wherein said benzophenone is 2-hydroxy-4-n-octoxybenzphenone, and said phosphonate is diethyl ethylphosphonate.

4. A composition comprising:
 (a) a polymer selected from the group consisting of polymers and copolymers of 1-olefins having from 2 to 10 carbon atoms, ethyl cellulose, cellulose acetate, cellulose, propionate, cellulose acetate butyrate, cellulose nitrate, polyvinyl chloride, polyvinyl chloride-acetate, polyvinylidene chloride, polyvinyl fluoride, polyvinylidene fluoride or polyvinyl dichloride; having incorporated thereon a stabilizing amount of (b) at least one organic phosphonate having the formula:

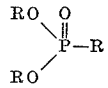

wherein R is an alkyl, cycloalkyl, or aryl group, or combinations thereof, having from 1 to 20 carbon atoms; and (c) at least one benzophenone compound having the general formula:

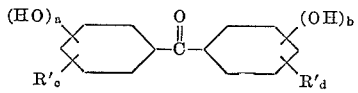

wherein R' is R as defined above or OR and wherein $a$, $b$, $c$, and $d$ are each 0 or 1 and the sum of $a+b$, and of $c+d$, respectively, is 1 or 2, and further, if $a+b$ equal 1, the resulting hydroxy group is either in the 2 or 6 position on the corresponding benzene ring.

5. The composition of claim 4 wherein the concentration of the phosphonate and the benzophenone are each in the range of from 0.001 to 10 parts by weight per 100 parts by weight of said resin.

6. The composition of claim 4 wherein said polymer is selected from the group consisting of polymers and copolymers of 1-olefins having from 2 to 10 carbon atoms, and mixtures thereof.

7. The composition of claim 6 wherein said polymer is polypropylene.

8. The composition of claim 7 wherein said benzophenone compound is 2 - hydroxy-4-n-octoxybenzophenone, and said organic phosphonate is diethyl ethylphosphonate.

9. The mixture of claim 1 wherein said benzophenone is 2-hydroxy-4-n-octoxybenzophenone and said phosphonate, is dibutyl butylphosphonate.

10. The mixture of claim 1 wherein said benzophenone is 2-hydroxy-4-n-octoxybenzophenone and said phosphonate is bis(2-ethylhexyl) 2-ethylhexylphosphonate.

11. The composition of claim 7 wherein said benzophenone compound is 2-hydroxy-4-n-octoxybenzophenone and said organic phosphonate is dibutyl butylphosphonate.

12. The composition of claim 7 wherein said benzophenone compound is 2-hydroxy-4-n-octoxybenzophenone and said organic phosphonate is bis(2-ethylhexyl) 2-ethylhexylphosphonate.

References Cited
UNITED STATES PATENTS

| | | | |
|---|---|---|---|
| 2,952,658 | 9/1960 | Pfeifer et al. | 260—45.7 |
| 3,115,465 | 12/1963 | Orloff et al. | 260—45.95 |
| 3,278,983 | 10/1966 | Wright et al. | 260—45.95 |
| 3,058,941 | 10/1962 | Birum | 260—45.7 |
| 3,280,070 | 10/1966 | Di Battista | 260—45.95 |

HOSEA E. TAYLOR, Jr., Primary Examiner

U.S. Cl. X.R.

106—177, 187; 117—138.5, 138.8, 144; 252—300, 400; 260—45.7, 45.85